US012325061B1

(12) United States Patent
Huff et al.

(10) Patent No.: US 12,325,061 B1
(45) Date of Patent: Jun. 10, 2025

(54) SELF-PIERCING RIVET DIE, ASSEMBLY, AND METHOD OF JOINING MATERIALS WITH A SELF-PIERCING RIVET

(71) Applicant: Ford Global Technologies, LLC, Dearborn, MI (US)

(72) Inventors: Garret Sankey Huff, Ann Arbor, MI (US); Andrey M. Ilinich, Novi, MI (US); Amanda Kay Freis, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/532,530

(22) Filed: Dec. 7, 2023

(51) Int. Cl.
  *B21J 15/02* (2006.01)
  *B21J 15/36* (2006.01)
  *F16B 5/04* (2006.01)

(52) U.S. Cl.
  CPC ............ *B21J 15/025* (2013.01); *B21J 15/36* (2013.01); *F16B 5/04* (2013.01); *Y10T 29/49835* (2015.01); *Y10T 29/49837* (2015.01); *Y10T 29/49943* (2015.01); *Y10T 29/49956* (2015.01); *Y10T 29/5343* (2015.01)

(58) Field of Classification Search
  CPC ... B21J 15/025; B21J 15/36; Y10T 29/49835; Y10T 29/49837; Y10T 29/49943; Y10T 29/49956; Y10T 29/5343
  See application file for complete search history.

(56) References Cited

U.S. PATENT DOCUMENTS

| | | | | |
|---|---|---|---|---|
| 5,056,207 | A | * 10/1991 | Ladouceur | B23P 19/062 29/512 |
| 5,067,224 | A | * 11/1991 | Muller | F16B 37/068 29/798 |
| 5,140,735 | A | * 8/1992 | Ladouceur | B23P 19/062 72/357 |
| 6,842,962 | B1 | 1/2005 | Blacket | |
| 9,919,356 | B2 * | 3/2018 | Bartig | B21J 15/025 |

(Continued)

FOREIGN PATENT DOCUMENTS

| | | | | |
|---|---|---|---|---|
| DE | 102015219757 A1 | * 4/2017 | ............ | B21J 15/025 |
| JP | 2003305530 A | * 10/2003 | ............ | B21J 15/025 |

OTHER PUBLICATIONS

Machine translation of JP 2003305530A (Year: 2003).*

(Continued)

*Primary Examiner* — Jermie E Cozart
(74) *Attorney, Agent, or Firm* — Burris Law, PLLC

(57) ABSTRACT

A method of joining substrates includes positioning the substrates on a die and pressing a self-piercing rivet until it penetrates into the bottom substrate and deforms the bottom substrate into a relief of the die defined by at least: a raised central portion, an outer portion disposed about a central axis of the die, a side surface disposed about the central axis, and an annular channel disposed about the central axis and disposed, in a radial direction, between the raised central portion and the outer portion. The side surface connects the outer portion to the top surface. The annular channel is recessed axially from the raised central portion and at least a part of the outer portion that is adjacent to the annular channel. The annular channel is radially inward of a toe of the self-piercing rivet after the deforming the bottom substrate into the relief.

19 Claims, 3 Drawing Sheets

(56) References Cited

U.S. PATENT DOCUMENTS

| | | | | |
|---|---|---|---|---|
| 2004/0216304 A1* | 11/2004 | Naito | ................ | B21J 15/36 |
| | | | | 29/798 |
| 2005/0161965 A1* | 7/2005 | Eberlein | ............ | B23K 11/0066 |
| | | | | 296/29 |
| 2013/0125611 A1* | 5/2013 | Danyo | ................ | B21J 15/36 |
| | | | | 72/470 |
| 2015/0290914 A1* | 10/2015 | Campbell | ............ | B21J 15/08 |
| | | | | 156/92 |
| 2018/0283423 A1* | 10/2018 | Huff | ................ | F16B 19/086 |

OTHER PUBLICATIONS

Stanley Engineered Fastening, New die innovations, Slide from Automotive Circle Conference, Presented by Mattias Wissling on Feb. 14, 2023, Rochester, Michigan, United States.

\* cited by examiner

SELF-PIERCING RIVET DIE, ASSEMBLY, AND METHOD OF JOINING MATERIALS WITH A SELF-PIERCING RIVET

FIELD

The present disclosure relates to a self-piercing rivet die, an assembly with a self-piercing rivet, and a method of joining materials with a self-piercing rivet.

BACKGROUND

The statements in this section merely provide background information related to the present disclosure and may not constitute prior art.

A traditional self-piercing rivet (SPR) is typically used to join two sheet metal substrates. The sheet metal used for traditional SPR assemblies are relatively ductile materials such as steel. However, some applications would benefit from using other materials that tend to be more brittle than traditional sheet metal. For example, in some applications, aluminum castings can be a lighter weight alternative. However, it can be difficult to join such relatively brittle materials using traditional SPR tools.

The teachings of the present disclosure address these and other issues associated with traditional SPR assembly tools and methods.

SUMMARY

This section provides a general summary of the disclosure and is not a comprehensive disclosure of its full scope or all of its features.

In one form, the present disclosure provides a method of joining a top substrate to a bottom substrate includes positioning the bottom substrate on a top surface of a die. The method includes positioning the top substrate on the bottom substrate so that the bottom substrate is between the top substrate and the die in an axial direction of the die. The method includes pressing a self-piercing rivet in the axial direction against the top substrate until the self-piercing rivet penetrates through the top substrate and into the bottom substrate. Pressing the self-piercing rivet deforms the bottom substrate into a relief defined by at least: a raised central portion of the die; an outer portion of the die disposed about a central axis of the die; a side surface of the die disposed about the central axis, the side surface connecting the outer portion to the top surface; and an annular channel disposed about the central axis and disposed, in a radial direction, between the raised central portion and the outer portion, the annular channel being recessed in the axial direction from the raised central portion and at least a part of the outer portion that is adjacent to the annular channel. The annular channel is radially inward of a toe of the self-piercing rivet after the self-piercing rivet deforms the bottom substrate into the relief.

In variations of the method of the above paragraph, which may be implemented individually or in any combination: the annular channel is radially inward of the toe of the self-piercing rivet before the self-piercing rivet deforms the bottom substrate into the relief; the raised central portion is between the top surface and the outer portion in the axial direction; a depth of the raised central portion from the top surface is between 10% and 80% of a maximum depth of the relief; a depth of the outer portion from the top surface increases with radial distance from the annular channel; pressing the self-piercing rivet deforms the bottom substrate to enter the annular channel; a depth of the outer portion from the top surface increases with radial distance from the annular channel; the depth increases at an angle between 0.5° and 10°; the outer portion is substantially perpendicular to the axial direction; a depth of the annular channel from the outer portion to a deepest point of the annular channel is between 0.1 mm and 0.5 mm, inclusive; the raised central portion is substantially perpendicular to the axial direction; pressing the self-piercing rivet deforms the bottom substrate to fill the annular channel; pressing the self-piercing rivet deforms the bottom substrate such that the bottom substrate does not fill a portion of the relief proximate the side surface. In another form, the present disclosure provides for an assembly formed according to the method of the preceding paragraph or any of the variations or combinations of variations of this paragraph, the assembly including the top substrate, the bottom substrate, and the self-piercing rivet.

In still another form, the present disclosure provides an assembly including a top substrate, a bottom substrate, and a self-piercing rivet. The top substrate has a top surface and a bottom surface. The bottom substrate is adjacent to the bottom surface of the top substrate. The self-piercing rivet is disposed about a central axis. A head of the self-piercing rivet is adjacent the top surface of the top substrate and a shank of the self-piercing rivet extends through the top substrate. The bottom substrate includes a bottom surface, a button, and an annular protrusion. The button protrudes in an axial direction from the bottom surface of the bottom substrate. The annular protrusion extends in the axial direction from the button. The annular protrusion is entirely radially inward of a toe of the self-piercing rivet.

In a variation of the assembly of the preceding paragraph, the button includes an outer surface and a peripheral wall surface. The outer surface is disposed radially between the annular protrusion and the peripheral wall surface. The peripheral wall surface extends between the bottom surface of the bottom substrate and the outer surface. A distance, in the axial direction, between the toe and the outer surface increases with increased radial distance from the central axis.

In yet another form, the present disclosure provides a rivet die including a top surface and a relief recessed from the top surface. The relief is defined by at least: a raised central portion, a central axis of the rivet die extending through the raised central portion; an outer portion disposed about the central axis; a side surface disposed about the central axis, the side surface connecting the outer portion to the top surface; and an annular channel disposed about the central axis and disposed, in a radial direction, between the raised central portion and the outer portion, the annular channel being recessed in an axial direction from the raised central portion and at least part of the outer portion that is adjacent to the annular channel. A depth of the outer portion from the top surface increases with radial distance from the annular channel.

In variations of the rivet die of the above paragraph, which may be implemented individually or in any combination: the raised central portion is between the top surface and an entirety of the outer portion in the axial direction; a depth of the raised central portion from the top surface is between 10% and 80% of a maximum depth of the relief; the depth increases at an angle between 0.5° and 10°.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
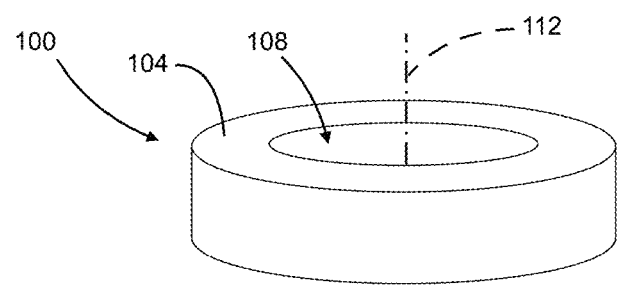
FIG. 1 is a schematic perspective view of a die for use with a self-piercing rivet according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a self-piercing rivet die 100 is schematically illustrated. The die 100 is a single-piece body that includes a top surface 104 and a relief 108 recessed from the top surface 104. The die 100 may be symmetric about a central axis 112. The die is a rigid material such as steel, for example.

Figure 2:
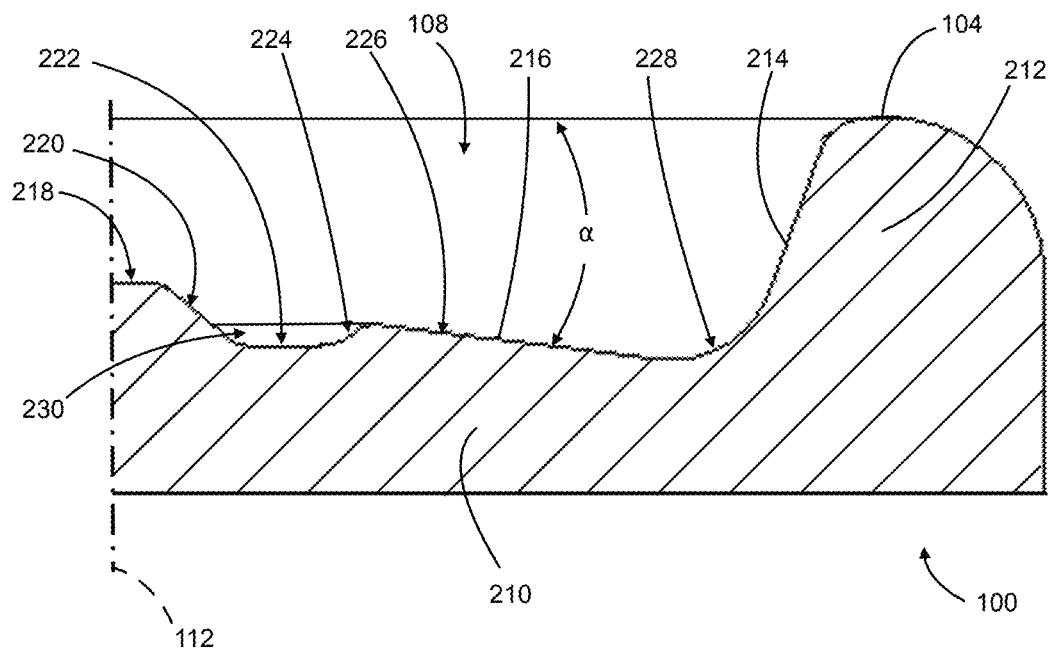
FIG. 2 is a cross-sectional view of a portion of the die of FIG. 1.

Referring to FIG. 2, a cross-section of half of the die 100 is shown, taken along the central axis 112. The relief 108 is symmetric about the central axis 112 such that it is understood that the other half of the cross-section of the die 100 that is not shown is a mirror image of the half shown. In other words, the features of the relief 108 shown and discussed herein are understood to be revolved 360 degrees around the central axis 112.

The relief 108 has a generally circular shape disposed about the central axis 112. The relief 108 is defined by a bottom wall 210 and a peripheral wall 212. The peripheral wall 212 is radially outward of the bottom wall 210 and defines the top surface 104 and a side surface 214. The bottom wall 210 defines a bottom surface 216. The relief 108 is defined by the side surface 214 and the bottom surface 216. The side surface 214 connects the bottom surface 216 to the top surface 104.

The bottom surface 216 spans the entire bottom of the relief 108 and includes a raised central portion 218, a first transition portion 220, a channel bottom portion 222, a second transition portion 224, an outer portion 226, and a third transition portion 228. The raised central portion 218 extends from the central axis 112 radially outward to the first transition portion 220. The first transition portion 220 extends radially outward to the channel bottom portion 222. The channel bottom portion 222 extends radially outward to the second transition portion 224. The second transition portion 224 extends radially outward to the outer portion 226. The outer portion 226 extends radially outward to the third transition portion 228. The third transition portion 228 extends radially outward to the side surface 214 to transition the bottom surface 216 to the side surface 214. As such, the raised central portion 218, the first transition portion 220, the channel bottom portion 222, the second transition portion 224, the outer portion 226, the third transition portion 228, the side surface 214, and the top surface 104 are disposed about the central axis 112.

The raised central portion 218 is axially between the channel bottom portion 222 and the top surface 104. In the example provided, the raised central portion 218 is also axially between the outer portion 226 and the top surface 104. In one form, the raised central portion 218 can be between 10% and 80%, inclusive, of the maximum depth of the relief 108 from the top surface 104. In the example provided, the raised central portion 218 is substantially perpendicular to the axis 112, though other configurations can be used, such as being rounded (e.g., convex or concave), or angling downward toward the central axis 112, or angling upward toward the central axis 112.

The first transition portion 220 connects and transitions the raised central portion 218 to the channel bottom portion 222. The first transition portion 220 extends downward it gets further radially outward. The first transition portion 220 can be generally frustoconical in shape or can have a convex and/or concave curvature between the raised central portion 218 and the channel bottom portion 222. In one form, the first transition portion 220 can have a generally frustoconical shape that transitions to the channel bottom portion 222 via a concave curvature and transitions to the raised central portion 218 via a convex curvature.

The channel bottom portion 222 connects the first transition portion 220 to the second transition portion 224. In the example provided, the channel bottom portion 222 is substantially perpendicular to the central axis 112, though other configurations can be used. For example, the channel bottom portion 222 can be curved (e.g., concave) or can angle down and radially outward or can angle upward and radially outward. Relative to the top surface 104, a deepest point of the channel bottom portion 222 is axially below the raised central portion 218 and a shallowest point of the outer portion 226. In one form, the depth from a radially inward-most location of the outer portion 226 (i.e., a radially outward-most location of the second transition portion 224) to a deepest point of the channel bottom portion 222 is between 0.1 mm and 0.5 mm, inclusive.

The second transition portion 224 connects and transitions the channel bottom portion 222 to the outer portion 226. The second transition portion 224 extends upward as it gets further radially outward. The second transition portion 224 can be generally frustoconical in shape or can have a convex and/or concave curvature between the channel bottom portion 222 and the outer portion 226. In one form, the second transition portion 224 can have a generally frustoconical shape that transitions to the channel bottom portion 222 via a concave curvature and transitions to the outer portion 226 via a convex curvature. In the example provided, the second transition portion 224 meets the outer portion 226 at a location that is axially between the channel bottom portion 222 and the raised central portion 218.

The outer portion 226 connects the second transition portion 224 to the third transition portion 228. In the example provided, the outer portion 226 extends downward it gets further radially outward. In other words, the depth of the outer portion 226 from the top surface 104 increases with radial distance from the central axis 112. In one form, the depth of the outer portion 226 can increase according to an angle α between 0.5° and 10°, inclusive. In one form, the depth of the outer portion 226 can increase according to an angle α between 3° and 5°, inclusive. In another form, the depth of the outer portion 226 can increase in a manner such that the angle α is not constant along the entire length of the outer portion 226, on non-limiting example of such being the depth increasing in a non-linear manner. In another form, not specifically shown, the outer portion 226 can be substantially perpendicular to the central axis 112. The outer portion 226 can be generally frustoconical in shape or can have a concave curvature between the second transition portion 224 and the third transition portion 228. In one form, the outer portion 226 can have a generally frustoconical shape that transitions to the second transition portion 224 via a convex curvature and transitions to the third transition portion 228 via a concave curvature.

In one form, the outer portion 226 can angle downward such that the deepest point of the outer portion 226 is deeper than the deepest point of the channel bottom portion 222. In another form, the deepest point of the channel bottom portion 222 can be deeper than the deepest point of the outer portion 226.

The third transition portion 228 connects and transitions the outer portion 226 to the side surface 214. The third transition portion 228 extends upward as it gets further radially outward. The third transition portion 228 can have a generally concave curvature between the outer portion 226 and the side surface 214.

The side surface 214 connects and transitions the third transition portion 228 to the top surface 104. In the example provided, the side surface 214 is angled such that it extends upward as it gets further radially outward. In another form, not specifically shown, the side surface 214 may extend substantially straight upward, e.g., parallel to the central axis 112. In the example provided, the side surface 214 can be generally frustoconical in shape or can have a convex and/or concave curvature between the third transition portion 228 and the top surface 104. In one form, the side surface 214 can have a generally frustoconical shape that transitions to the third transition portion 228 via a concave curvature and transitions to the top surface 104 via a convex curvature.

In one form, the top surface 104 can be flat and substantially perpendicular to the central axis 112. In another form, the top surface 104 may be convex and may curve downward with increased radial distance from the central axis 112.

As such, at least part of the first transition portion 220 cooperates with the channel bottom portion 222 and the second transition portion 224 to define an annular channel 230 disposed coaxially about the central axis 112 and recessed from the raised central portion 218 and at least the radially inward-most part of the outer portion 226.

In one form, the distance in the radial direction from the central axis 112 to the top surface 104 can be 5.5 mm or greater, though other configurations can be used including less than 5.5 mm.

In an alternative form, not specifically shown, the first transition portion 220 can be substantially parallel to the central axis 112.

In one form, the depth of the annular channel 230 from the highest part of the outer portion 226 can be between 0.2 mm to 0.5 mm, inclusive.

In one form, the junction between the raised central portion 218 and the first transition portion 220, and/or the junction between the first transition portion 220 and the channel bottom portion 222, and/or the junction between the channel bottom portion 222 and the second transition portion 224, and/or the junction between the second transition portion 224 and the outer portion 226 can have a radius and different junctions may have different radii or the same radii. In one form the third transition portion 228 can be a radius. This radius may be the same as or different than the other radii mentioned herein at these junctions. In one form, the junction between the side surface 214 and the top surface 104 can have a radius. This radius may be the same as or different than the other radii mentioned herein at these junctions. In one form, the radii mentioned herein are less than or equal to 1 mm. In configurations where a radius forms the junction between the second transition portion 224 and the outer portion 226, the outer diameter of the annular channel 230 is understood to be at the location where this junction is shallowest (i.e., closest to the top surface 104).

Figure 3:
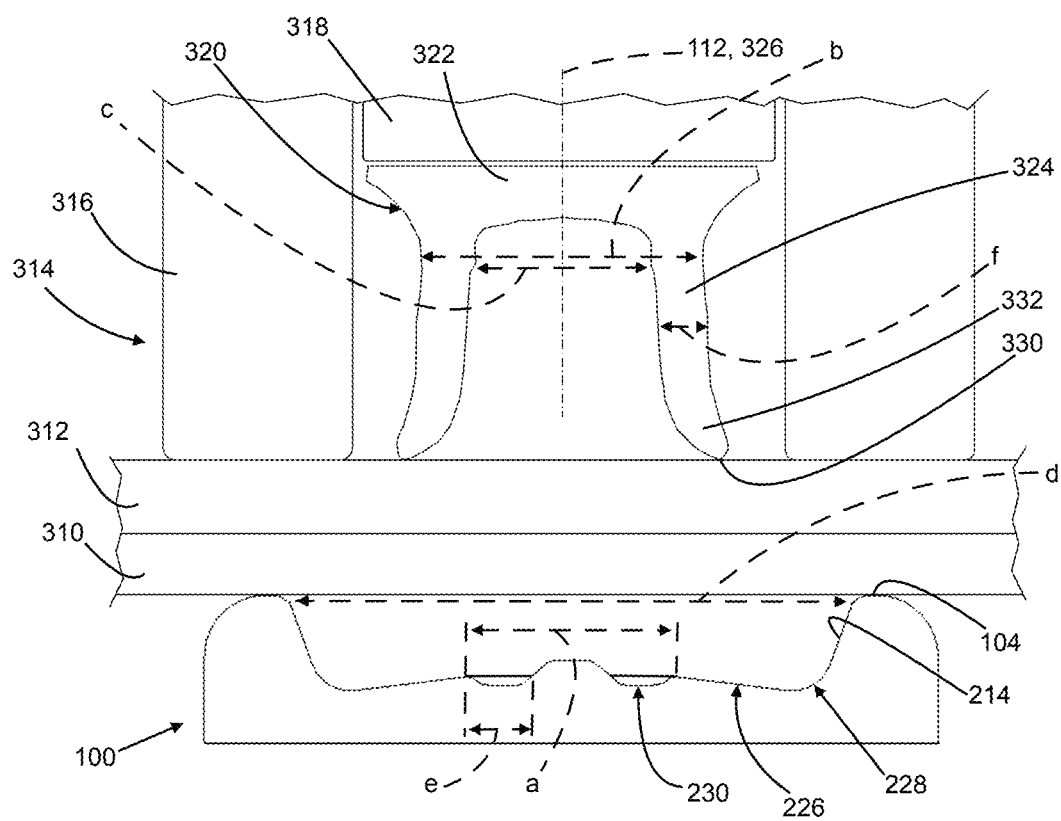
FIG. 3 is a cross-sectional view illustrating a tool, substrates, the die of FIG. 1, and a self-piercing rivet during a step of a method of joining the substrates with the self-piercing rivet according to the present disclosure.
Figure 4:
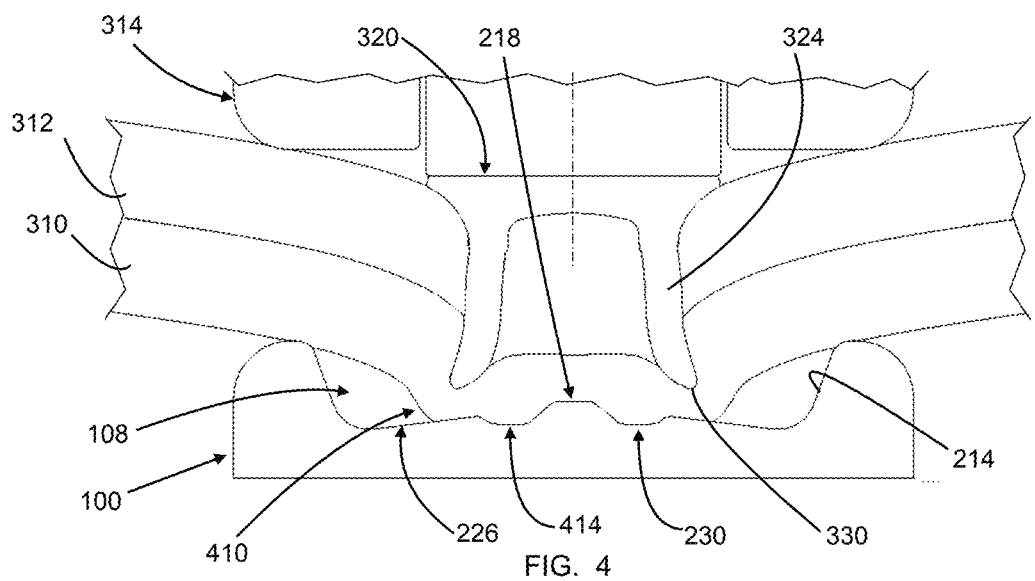
FIG. 4 is a cross-sectional view similar to FIG. 3, illustrating another step of the method according to the present disclosure.
Figure 5:
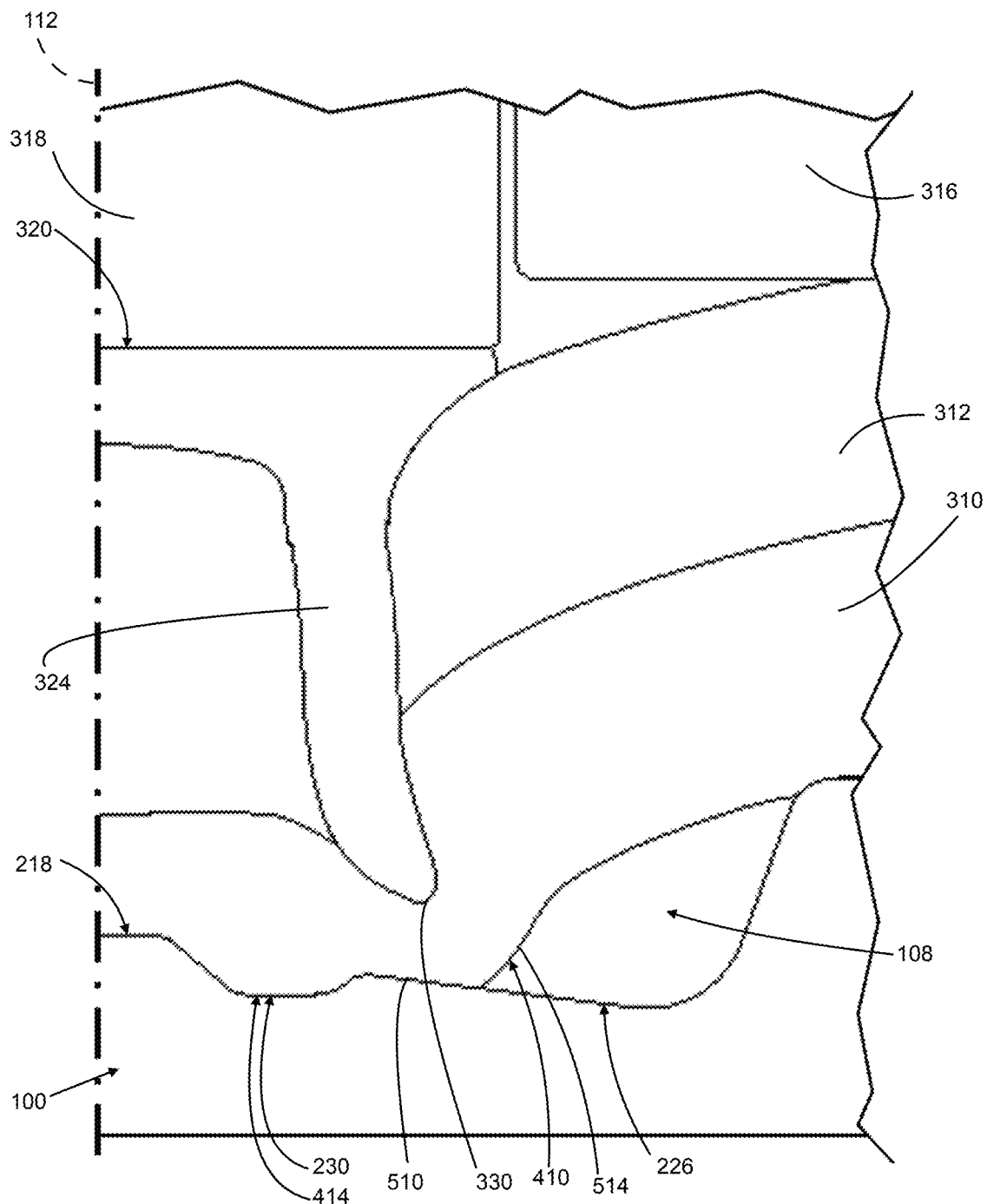
FIG. 5 is a cross-sectional detail view of a portion of the components shown in FIG. 4.

Referring to FIGS. 3-5, a method of joining a top substrate to a bottom substrate is described. While shown and described herein, with only the bottom substrate 310 and top substrate 312, additionally substrates (not shown) may optionally be between the bottom substrate 310 and the top substrate 312.

Referring specifically to FIG. 3, the method includes positioning a bottom substrate 310 on the top surface 104 of the die 100 and a top substrate 312 on the bottom substrate 310 so that the bottom substrate 310 is axially between the top substrate 312 and the die 100. In other words, a bottom surface of the top substrate 312 can contact a top surface of the bottom substrate 310 and a bottom surface of the bottom substrate 310 can contact the top surface 104 of the die 100. The die 100 is positioned coaxially with a riveting tool 314 on a rigid base (not shown).

A nose 316 of the riveting tool 314 is pressed against a top surface of the top substrate 312 to hold the top substrate 312 against the bottom substrate 310 and the bottom substrate 310 against the top surface 104. A punch 318 of the riveting tool 314 moves axially within the nose 316 to press a self-piercing rivet (SPR 320) against the top substrate 312.

The SPR 320 has a head 322 and a shank 324. The shank 324 is disposed annularly about a central axis 326 of the SPR 320 and extends from the head 322 axially to an end of the shank 324 also referred to as a toe 330 of the SPR 320. The shank 324 may also flare slightly radially outward as it approaches the toe 330. This flared portion can be referred to as a foot 332 of the shank 324. In some forms, the foot 332 is the last 0.5 mm to 1 mm of the shank 324, though other configurations can be used. The die 100 is sized relative to the SPR 320 such that the toe 330 is radially outward of the annular channel 230. In other words, the toe 330 aligns radially with the outer portion 226 before piercing the top substrate 312. To put it another way, the toe 330 is radially outward of the shallowest part of the junction between the second transition portion 224 and the outer portion 226. In the example provided, a portion of the shank 324 proximate the head 322 can overlap in the radial direction with the annular channel 230. In the example provided, the outer diameter of the channel 230 (i.e., distance a) is less than the outer diameter of the shank 324 proximate the head 322 (i.e., distance b) and the inner diameter of the shank 324 proximate the head 322 (i.e., distance c) is less than the outer diameter of the channel 230 (i.e., distance a). In another form, an entirety of the shank 324 can be radially outward of the annular channel 230. In other words, distance c may be greater than distance a.

In one form, the annular channel 230 can have a radial width (i.e., distance e) that is wider in the radial direction than the shank 324 (i.e., thickness f), though other configurations can be used.

In one form, the inner diameter of the top surface 104 (i.e., distance d) can be greater than or equal to 1.8 times the outer diameter of the shank 324 proximate the head 322 (i.e., distance b) and less than or equal to 3 times the outer diameter of the shank 324 proximate the head 322 (i.e., distance b): $1.8*b \leq d \leq 3*b$, though other configurations can be used.

As shown in FIG. 4, the punch 318 continues to move axially in the direction toward the die 100 to press the SPR 320 into the top substrate 312 until the SPR 320 penetrates through the top substrate 312 and partially into, but not through, the bottom substrate 310. As such, the SPR 320 deforms the top substrate 312 and the bottom substrate 310. At least the bottom substrate 310 is deformed into the relief 108. The bottom substrate 310 is deformed over the raised central portion 218, into the annular channel 230, and into contact with at least part of the outer portion 226. In the example provided, the bottom substrate 310 fills an entirety of the annular channel 230. In an alternative form, not specifically shown, the bottom substrate 310 enters the annular channel 230 but does not completely fill it.

FIGS. 4 and 5 illustrate the SPR 320 in a fully installed state before retracting the riveting tool 314 and removing the assembly (i.e., bottom substrate 310, top substrate 312, and SPR 320) from the die 100. As shown, the bottom substrate 310 need not be deformed so much as to fill the entire relief 108. In other words, the side surface 214 can be radially outward enough that the bottom substrate 310 does not fill a portion of the relief 108 proximate the side surface 214 and may also optionally not contact the entirety of the outer portion 226 such that it also does not contact the third transition portion 228.

The annular channel 230 being radially inward of the toe 330 helps flare the shank 324 outward. The down and outward angle of the outer portion 226 further can help flare and guide the shank 324 outward. The orientations of the annular channel 230, the outer portion 226, and the side surface 214 relative to the toe 330 also reduces cracking on the underside (i.e., side facing away from the top substrate 312) of the bottom substrate 310.

After the SPR 320 is fully installed, the riveting tool 314 is retracted and the assembly is removed from the die 100. When fully installed, the head 322 is in contact with or adjacent to the top surface of the top substrate 312 and the shank 324 extends through the top substrate 312, while the bottom substrate 310 defines a button 410 and an annular protrusion 414. The button 410 protrudes in the axial direction from the surrounding bottom surface of the bottom substrate 310. The annular protrusion 414 extends in the axial direction from the button 410. The annular protrusion 414 is entirely radially inward of the toe 330. As best shown in FIG. 5, the button 410 can include an outer surface 510 and a peripheral wall surface 514. The outer surface 510 is disposed radially between the annular protrusion 414 and the peripheral wall surface 514, the peripheral wall surface 514 extending between the surrounding bottom surface of the bottom substrate 310 and the outer surface 510. A distance, in the axial direction, between the toe 330 and the outer surface 510 can increase with increased radial distance from the central axis 112.

Operation of the riveting tool 314 may be controlled by a controller (not specifically shown) in communication with the riveting tool 314.

It has been found that the method and die 100 of the present disclosure can be particularly beneficial in reducing strain and cracking of the bottom substrate 310 when the bottom substrate 310 is a relatively brittle material. Some non-limiting examples of such relatively brittle materials include aluminum, aluminum alloys, and steel sheets that have been pre-strained prior to joining, for example. In some nonlimiting forms, the bottom substrate 310 and/or the top substrate 312 may be formed via a casting or stamping process. In one form, the bottom substrate 310 is an aluminum casting. The top substrate 312 may be the same material or a different material than the bottom substrate 310.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability. As used herein, directions such as "down," or "downward," "up," or "upward," refer to the directions as illustrated in the drawings for ease of description and do not refer to or otherwise limit the orientation of the components relative to earth's surface and/or gravity, unless specifically described as such.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of joining a top substrate to a bottom substrate, the method comprising:
   positioning the bottom substrate on a top surface of a die;
   positioning the top substrate on the bottom substrate so that the bottom substrate is between the top substrate and the die in an axial direction of the die; and
   pressing a self-piercing rivet in the axial direction against the top substrate until the self-piercing rivet penetrates through the top substrate and into the bottom substrate, wherein pressing the self-piercing rivet deforms the bottom substrate into a relief defined by at least:
   a raised central portion of the die;
   an outer portion of the die disposed about a central axis of the die;
   a side surface of the die disposed about the central axis, the side surface being located radially between the outer portion and the top surface to connect the outer portion to the top surface; and
   an annular channel disposed about the central axis and disposed, in a radial direction, between the raised central portion and the outer portion, the annular channel being recessed in the axial direction from the raised central portion and at least a part of the outer portion that is adjacent to the annular channel,
   wherein the annular channel is radially inward of a toe of the self-piercing rivet after the self-piercing rivet deforms the bottom substrate into the relief,
   wherein the raised central portion is between the top surface and the outer portion in the axial direction.

2. The method according to claim 1, wherein the annular channel is radially inward of the toe of the self-piercing rivet before the self-piercing rivet deforms the bottom substrate into the relief.

3. The method according to claim 1, wherein a depth of the raised central portion from the top surface is between 10% and 80% of a maximum depth of the relief.

4. The method according to claim 1, wherein a depth of the outer portion from the top surface increases with radial distance from the annular channel.

5. The method according to claim 4, wherein pressing the self-piercing rivet deforms the bottom substrate to enter the annular channel.

6. The method according to claim 1, wherein a depth of the outer portion from the top surface increases with radial distance from the annular channel.

7. The method according to claim 6, wherein the depth increases at an angle between 0.5° and 10°.

8. The method according to claim 1, wherein the outer portion is substantially perpendicular to the axial direction.

9. The method according to claim 1, wherein a depth of the annular channel from the outer portion to a deepest point of the annular channel is between 0.1 mm and 0.5 mm, inclusive.

10. The method according to claim 1, wherein the raised central portion is substantially perpendicular to the axial direction.

11. The method according to claim 1, wherein pressing the self-piercing rivet deforms the bottom substrate to fill the annular channel.

12. The method according to claim 1, wherein pressing the self-piercing rivet deforms the bottom substrate such that the bottom substrate does not fill a portion of the relief proximate the side surface.

13. A method of joining a top substrate to a bottom substrate, the method comprising:
    positioning the bottom substrate on a top surface of a die;
    positioning the top substrate on the bottom substrate so that the bottom substrate is between the top substrate and the die in an axial direction of the die; and
    pressing a self-piercing rivet in the axial direction against the top substrate until the self-piercing rivet penetrates through the top substrate and into the bottom substrate, wherein pressing the self-piercing rivet deforms the bottom substrate into a relief defined by at least:
    a raised central portion of the die;
    an outer portion of the die disposed about a central axis of the die, wherein the outer portion is substantially perpendicular to the central axis;
    a non-planar side surface of the die encircling the central axis, the non-planar side surface connecting the outer portion to the top surface; and
    an annular channel disposed about the central axis and disposed, in a radial direction, between the raised central portion and the outer portion, the annular channel being recessed in the axial direction from the raised central portion and at least a part of the outer portion that is adjacent to the annular channel,
    wherein the annular channel is radially inward of a toe of the self-piercing rivet after the self-piercing rivet deforms the bottom substrate into the relief.

14. The method according to claim 13, wherein the annular channel is radially inward of the toe of the self-piercing rivet before the self-piercing rivet deforms the bottom substrate into the relief.

15. The method according to claim 13, wherein the raised central portion is between the top surface and the outer portion in the axial direction.

16. The method according to claim 15, wherein a depth of the raised central portion from the top surface is between 10% and 80% of a maximum depth of the relief.

17. The method according to claim 15, wherein a depth of the outer portion from the top surface increases with radial distance from the annular channel.

18. The method according to claim 17, wherein pressing the self-piercing rivet deforms the bottom substrate to enter the annular channel.

19. The method according to claim 13, wherein a depth of the outer portion from the top surface increases with radial distance from the annular channel.

* * * * *